(12) United States Patent
Kuo

(10) Patent No.: US 7,195,434 B1
(45) Date of Patent: Mar. 27, 2007

(54) CARGO NET

(76) Inventor: Su-Min Kuo, No. 18, Lane 29, Yu Nung Rd., Tainan (TW)

( * ) Notice: Subject to any disclaimer, the term of this patent is extended or adjusted under 35 U.S.C. 154(b) by 0 days.

(21) Appl. No.: 11/458,445

(22) Filed: Jul. 19, 2006

(51) Int. Cl.
*B60P 7/08* (2006.01)

(52) U.S. Cl. ............................. 410/118; 410/97; 87/2

(58) Field of Classification Search ............... 410/96, 410/97, 117, 118; 87/2, 5; 296/100.15, 100.16
See application file for complete search history.

(56) References Cited

U.S. PATENT DOCUMENTS 2,854,931 A * 11/1958 Campbell .................. 410/118
6,017,174 A * 1/2000 Ross et al. .................. 410/100

* cited by examiner

*Primary Examiner*—Stephen Gordon
(74) *Attorney, Agent, or Firm*—Anthony S. King; WPAT, P.C.

(57) ABSTRACT

A cargo net comprises multiple elastic cords arranged in parallel and alternatively secured at multiple fixed points in meshed form. The elastic cords are arranged in parallel longitudinally and woven laterally with elastic wires to define a woven area in a construction with a long stripe section. Any two abutted longer sides of the elastic cords are secured at the fixed points.

3 Claims, 4 Drawing Sheets

A

CARGO NET

BACKGROUND OF THE INVENTION (a) Field of the Invention

The present invention relates to a cargo net, and more particularly, to one applied to cover up a truck loaded cargo that provides easier storage and operation.

(b) Description of the Prior Art

As taught in U.S. Pat. Nos. 6,637,991 and 6,866,453 [D04G 1/00 & B61D 45/00] (all of which are incorporated herein by reference), an upper (central) part of a net is comprised of having tied up round cords, and a lower (side) part of the net is comprised of having flat cords connected with side panels.

However, in either patent cited, the essential part of the net, i.e., the central part is comprised of having round cords tied to one another. That is, the section of the cord is a circular form in a construction with sufficient strength to cover up a cargo when in use; but the cargo net prevents easy storage since it always gets tangled into a mess. The truck driver would have a difficult time and put a lot of efforts to sort out for the use next time.

SUMMARY OF THE INVENTION

The primary objective of the present invention is to provide a cargo net that allows easier storage and expansion for subsequent use. To achieve the objective, the cargo net of the present invention comprises multiple elastic cords with a stripe section and having abutted cords joined at their longer sides. The elastic cords are arranged in parallel longitudinally and alternatively secured at fixed points either by means of sewing threads or fasteners into a meshed form; and further woven laterally with elastic wires into a woven area in a construction showing a stripe section.

DETAILED DESCRIPTION OF THE PREFERRED EMBODIMENTS

Figure 1:
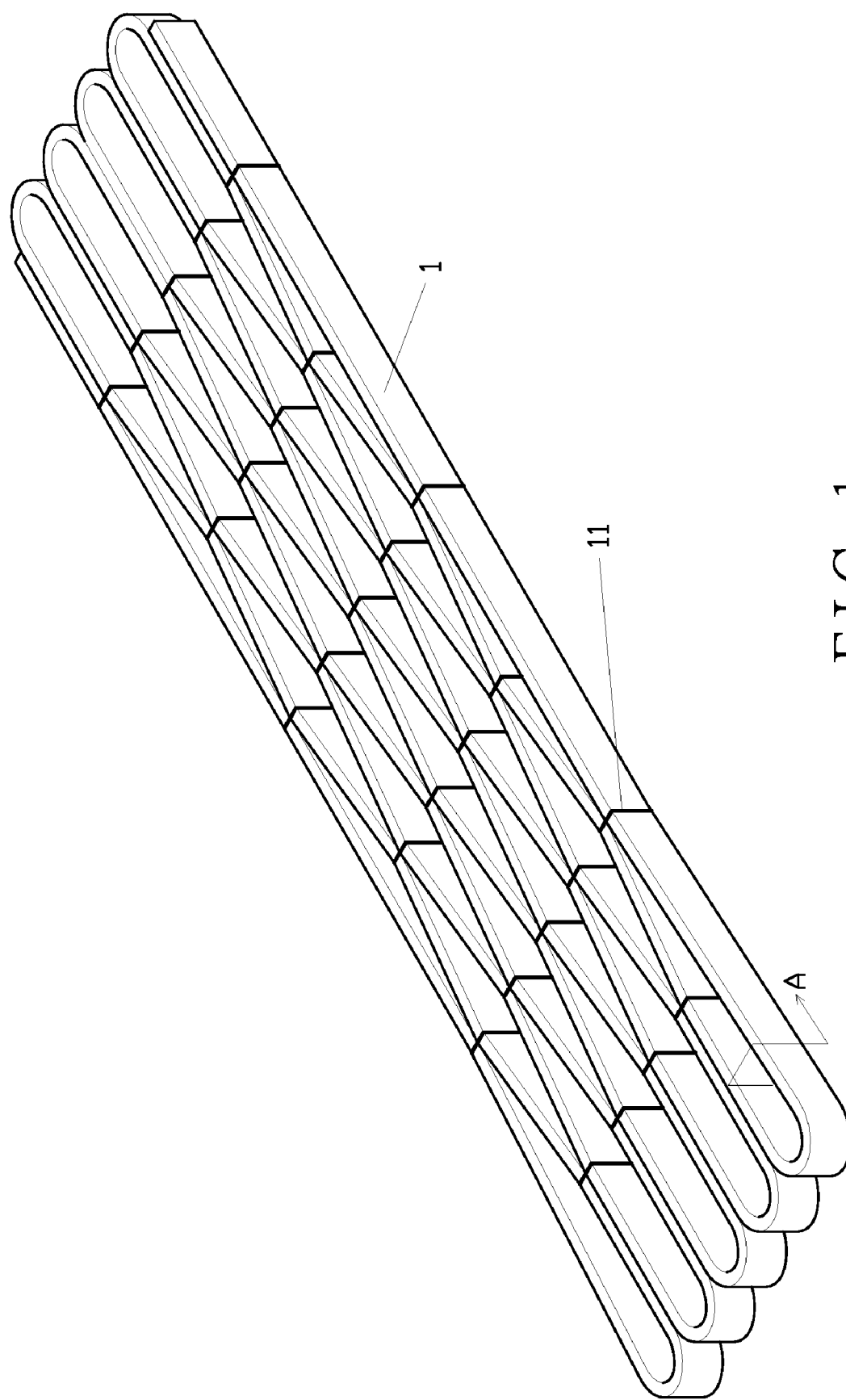
FIG. 1 is a perspective view of a preferred embodiment of the present invention when stored.
Figure 2:
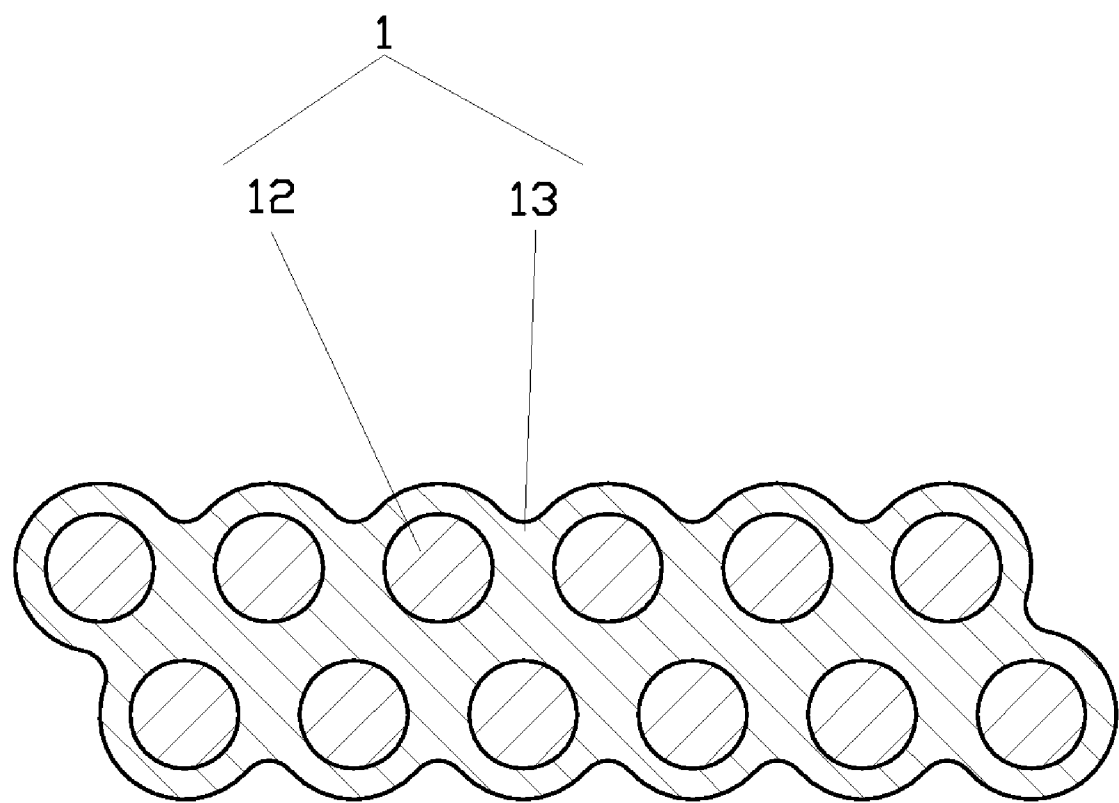
FIG. 2 is a cross-sectional view of an elastic cord of the preferred embodiment of the present invention taken at a lateral section at right angle to the longitudinally arranged elastic cords.

Referring to FIG. 1, a preferred embodiment of the present invention comprises multiple elastic cords (1) arranged in parallel with one another and alternatively sewn into a meshed form with multiple sewing threads (11) at fixed points. As illustrated in FIG. 2, the elastic cords (1) are composed of multiple elastic wires (12) arranged in parallel longitudinally and woven with wires laterally into a woven area (13) in a construction with a stripe section; and all abutted elastic cords (1) are secured at fixed points on the longer sides of the stripe.

Figure 3:
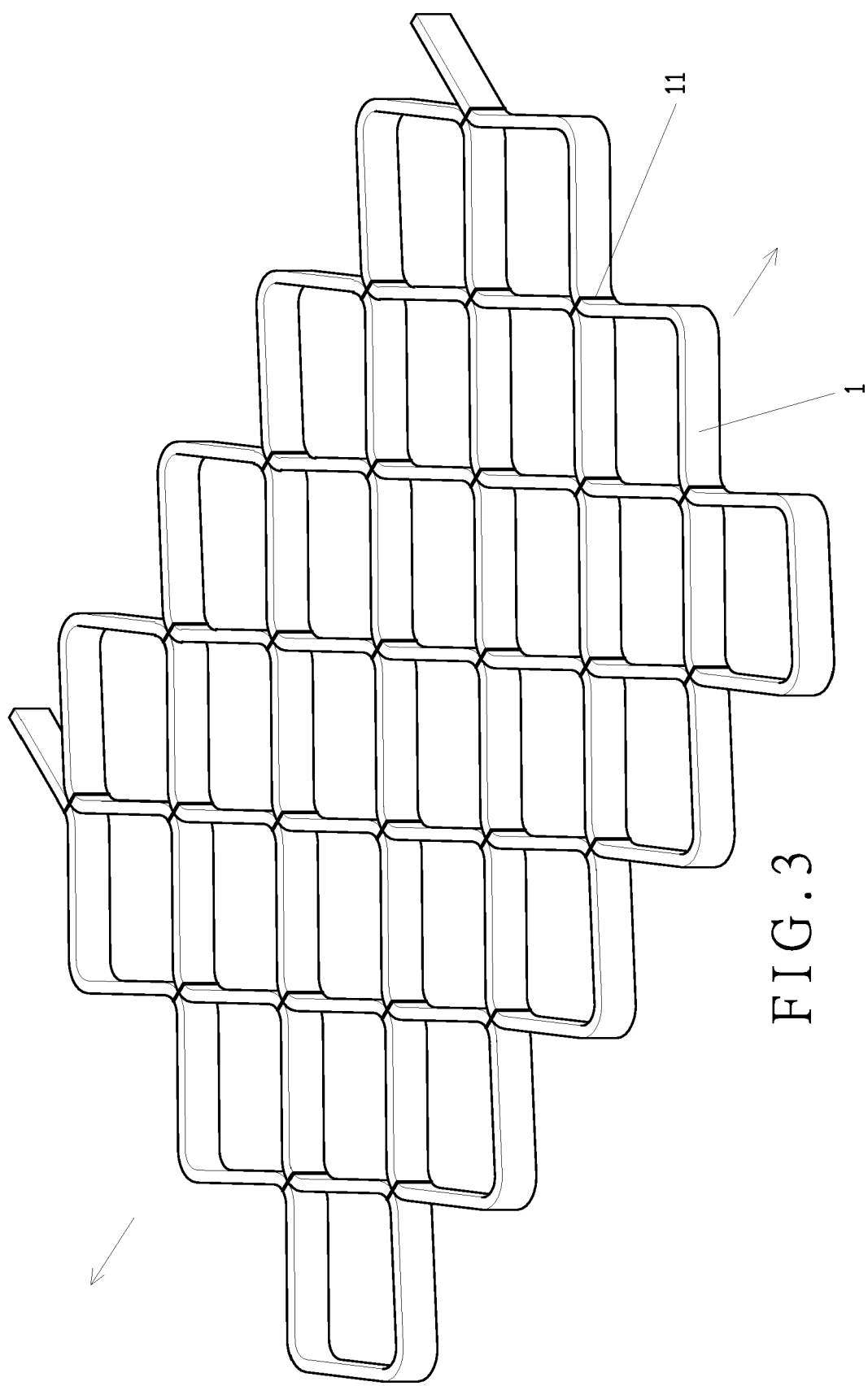
FIG. 3 is a schematic view showing that the preferred embodiment of the present invention is expanded in use.

Accordingly, as illustrated in FIG. 3 for a schematic view showing that the present invention is expanded for use, all the elastic cords (1) are pulled and extended regularly with the least efforts applied.

When not used as illustrated in FIG. 1, all the elastic cords (1) for having a stripe section are laid side by side and staying close to one another not only for saving space but also for easier storage. The stored cargo net is ready for the subsequent use simply by forthwith pulling it apart.

Figure 4:
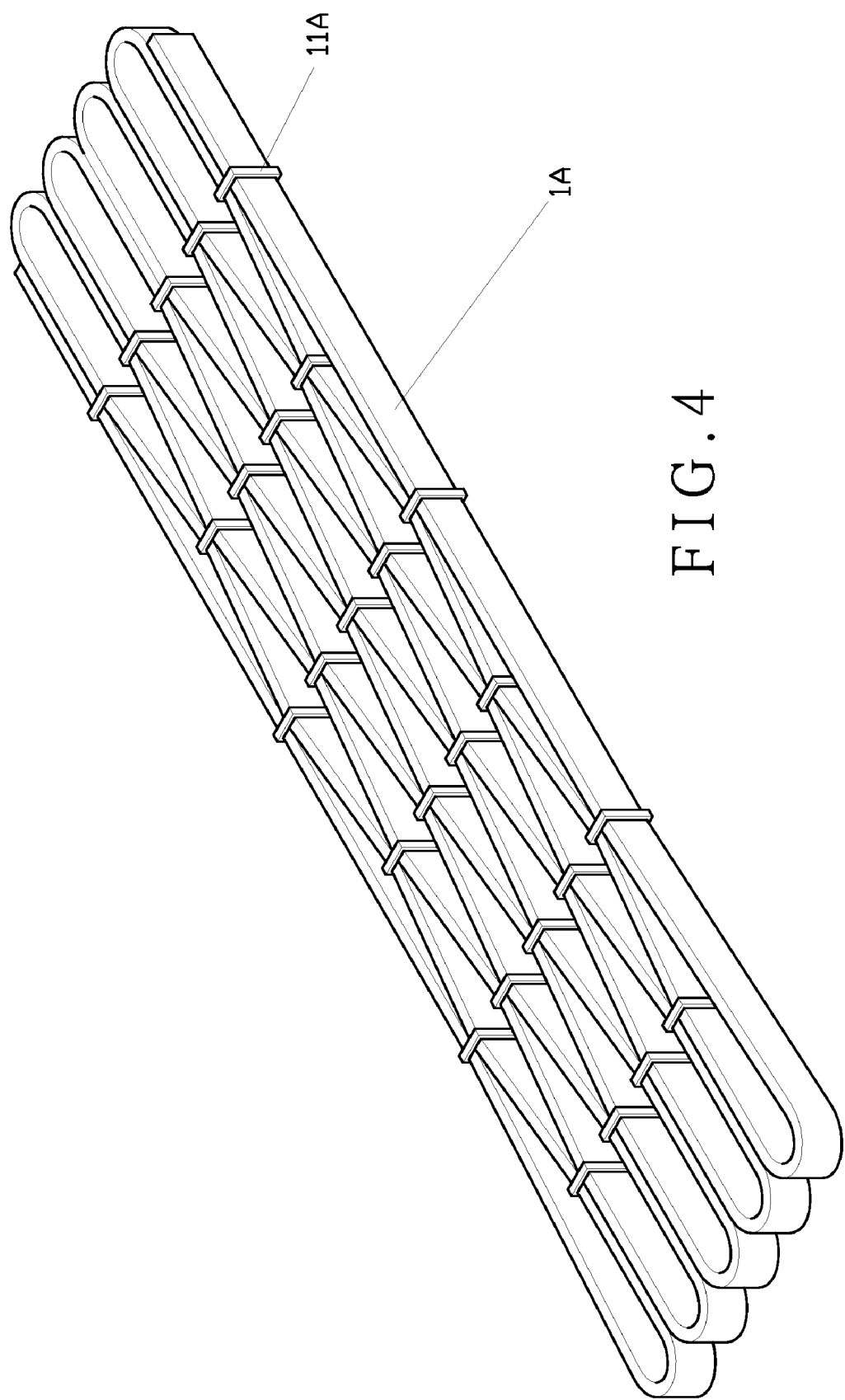
FIG. 4 is a perspective view of another preferred embodiment of the present invention.

FIG. 4 shows another preferred embodiment of the present invention, multiple elastic cords (1A) are arranged in parallel with one another and alternatively secured at fixed points by means of fasteners (11A) into a meshed form; that is the elastic cords (1A) are secured at the fixed points with the fasteners (11A).

Thus, specific embodiments and applications of cargo net have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . . and N, the text should be interpreted as requiring only one element from the group, not A plus N, or B plus N, etc.

What is claimed is:

1. A cargo net comprising multiple elastic cords arranged in parallel and alternatively secured at multiple fixed points in meshed form, and characterized by:
   the elastic cords being arranged in parallel longitudinally and woven laterally with elastic wires to define a woven area in a construction with a long stripe section; and any two abutted longer sides of the elastic cords being secured at the fixed points.

2. The cargo net as claimed in claim 1, wherein the elastic cords are secured at the fixed points by means of sewing threads.

3. The cargo net as claimed in claim 1, wherein the elastic cords are secured at the fixed points by means of fasteners.

* * * * *